(No Model.)

J. H. JOHNSON.
SAW.

No. 601,343. Patented Mar. 29, 1898.

Witnesses
Wm. F. Doyle.
J. A. Willson.

Inventor
Johannes H. Johnson.
By H. B. Willson.
Attorney

UNITED STATES PATENT OFFICE.

JOHANNES H. JOHNSON, OF NORTH CAPE, WISCONSIN, ASSIGNOR OF ONE-HALF TO JAMES FREDRICKSON, OF SAME PLACE.

SAW.

SPECIFICATION forming part of Letters Patent No. 601,343, dated March 29, 1898.

Application filed January 21, 1897. Serial No. 620,125. (No model.)

*To all whom it may concern:*

Be it known that I, JOHANNES H. JOHNSON, a citizen of the United States, residing at North Cape, in the county of Racine and State of Wisconsin, have invented certain new and useful Improvements in Saws; and I do declare the following to be a full, clear, and exact description of the invention, such as will enable others skilled in the art to which it appertains to make and use the same.

My invention relates to saws.

The object of the invention is to provide a saw with peculiarly-shaped teeth which will be more effective and render the operation of sawing less tiresome.

With this object in view the invention consists of a saw constructed as hereinafter described.

Figure 1:
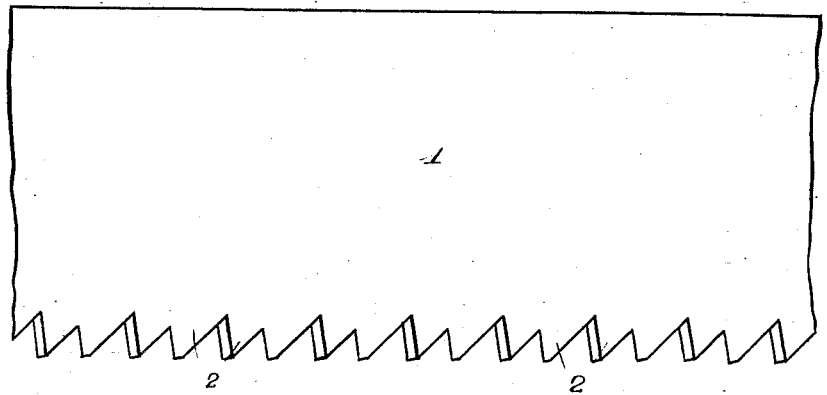
Figure 2:
Figure 3:
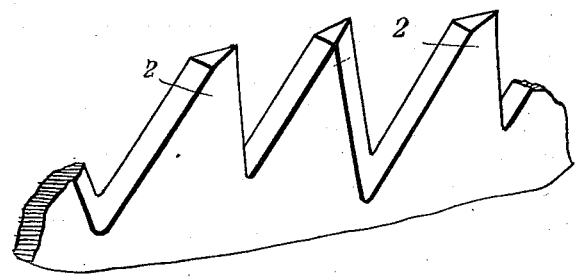

In the accompanying drawings, Figure 1 is a side elevation of a portion of a saw-blade embodying my invention. Fig. 2 is a transverse sectional view through several of the teeth of the saw. Fig. 3 is an enlarged perspective view of several of the teeth, and Fig. 4 is a view showing my invention in connection with a crosscut-saw.

In the drawings, 1 denotes the saw-blade, and 2 the teeth. Each tooth is provided with a beveled cutting forward edge and a flat inclined rear edge. The beveled or cutting edge is made on the opposite sides of alternate teeth, as shown in Fig. 2. The points of these teeth are filed off, as shown in Fig. 3, to produce gouging ends. By filing the points across the tips the length of the teeth is reduced, thus greatly strengthening the knife-edges of the teeth, and, furthermore, the filed points will act as rakers to remove the sawdust when the grain of the wood is cut by the knife-edge of the teeth and will pry the sawdust loose in a diagonal manner, thus making the saw cut very easily and fast.

Figure 4:
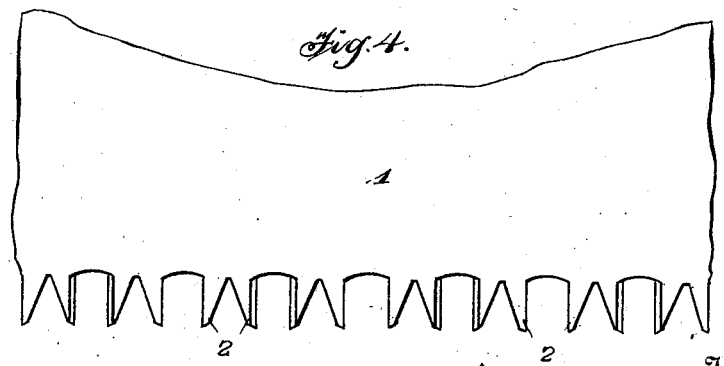

In Fig. 4 I have shown my invention applied to a crosscut-saw. The teeth of this saw, while of different shape and arrangement, are provided with cutting edges, and the points of these teeth are filed off in the same manner as those of the saw above described.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new, and desire to secure by Letters Patent, is—

1. A saw-blade provided with teeth having their cutting edges alternately beveled upon opposite sides of said blade and having their trilateral tip portions, formed by said beveling, removed, substantially as described.

2. A saw-blade provided with teeth having their cutting edges alternately beveled upon opposite sides of said blade and having their trilateral tip portions, formed by said beveling, cut away in the same plane, substantially as described.

In testimony whereof I hereunto affix my signature in presence of two witnesses.

JOHANNES H. JOHNSON.

Witnesses:
CARND E. ADLAND,
H. F. JOHNSON.